United States Patent [19]

Preston et al.

[11] Patent Number: 4,760,649
[45] Date of Patent: Aug. 2, 1988

[54] TRAVEL TRAILER LEVEL INDICATOR

[76] Inventors: Corlis E. Preston, 209 E. Duane Ave.; Victor K. Hsia, 208 E. Eaglewood Ave., both of Sunnyvale, Calif. 94086

[21] Appl. No.: 940,297
[22] Filed: Dec. 11, 1986
[51] Int. Cl.⁴ .......................... G01C 9/06; B60Q 1/52
[52] U.S. Cl. .................................... 33/333; 33/366; 33/391; 33/401
[58] Field of Search ............... 33/366, 391, 401, 402, 33/333

[56] References Cited
U.S. PATENT DOCUMENTS

| | | | |
|---|---|---|---|
| 3,861,052 | 1/1975 | Siegrried | 33/366 |
| 3,916,531 | 11/1975 | Morton | 33/333 |
| 4,182,046 | 1/1980 | Ludlow | 33/366 |
| 4,492,029 | 1/1985 | Tanaka et al. | 33/366 |
| 4,584,778 | 4/1986 | Komasaku et al. | 33/366 |
| 4,658,508 | 4/1987 | Oberg | 33/366 |

Primary Examiner—William D. Martin, Jr.
Attorney, Agent, or Firm—Corlis E. Preston; Victor K. Hsia

[57] ABSTRACT

A new solid state electronic position indicator used to determine the horizontal and longitudinal level attitude of a recreation vehicle. This device, mounted on the frame of the vehicle, senses an imbalance condition by relying on a gravity sensitive compound pendulum. The pendulum is rectangular in shape, rotating about a shaft mounted ball bearing. Movement of this pendulum is detected by the electronic sensing circuit. This circuit sends an electrical signal to a visual or audio receiver mounted within a control panel, remote from the sensor. The control panel is normally mounted on dash of tow vehicle. The signal display indicates which side or end of the recreation vehicle requires elevation to attain a level attitude required to safely operate the propane gas operated appliances, e.g. (refrigerator, hot water heater) and provide creature comfort.

4 Claims, 5 Drawing Sheets

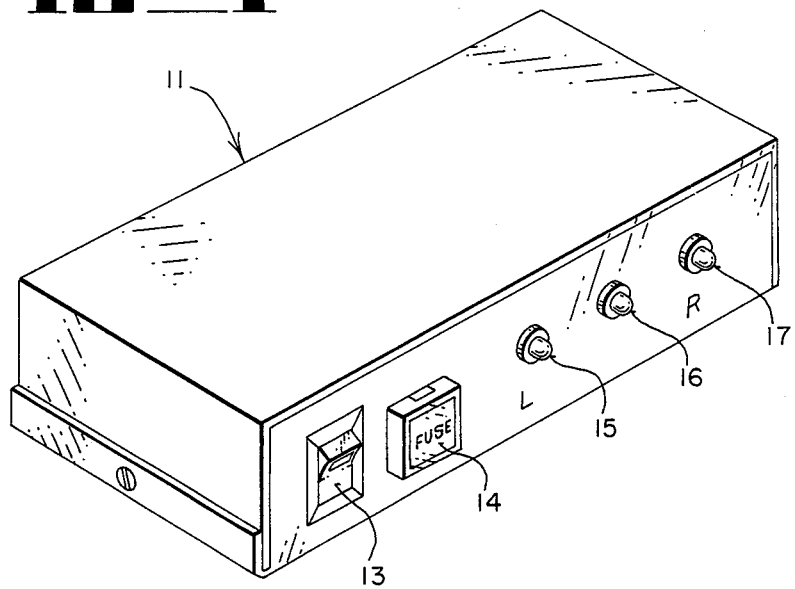
FIG_1
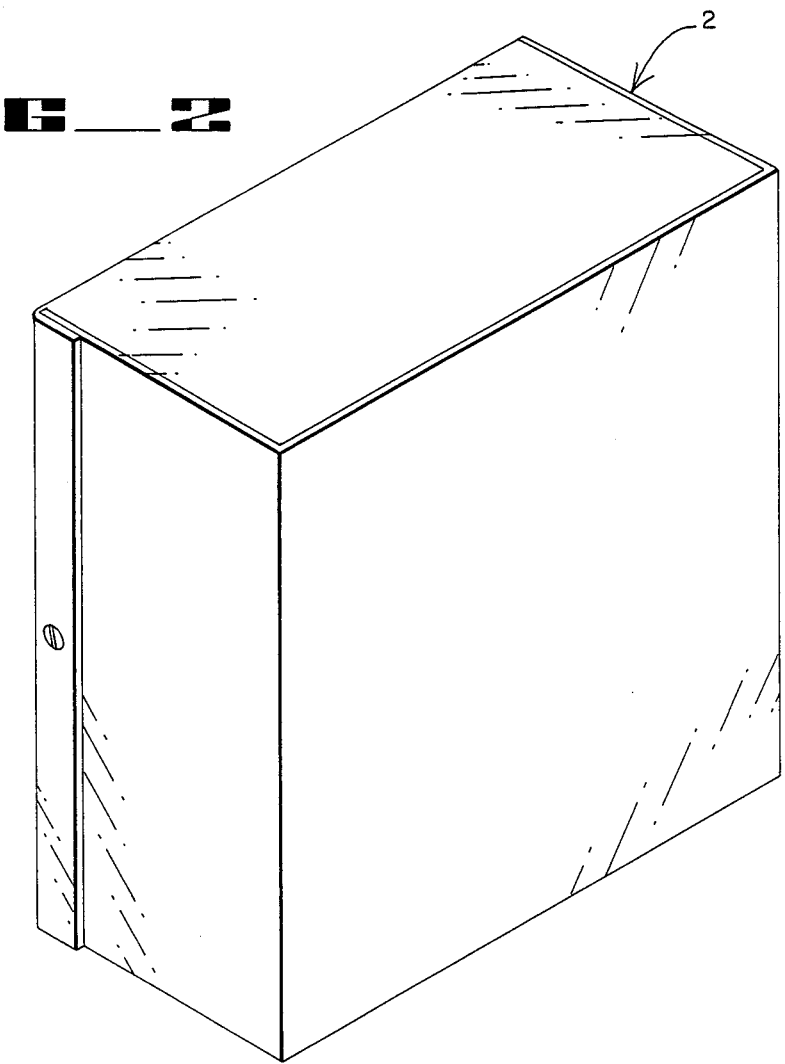
FIG_2

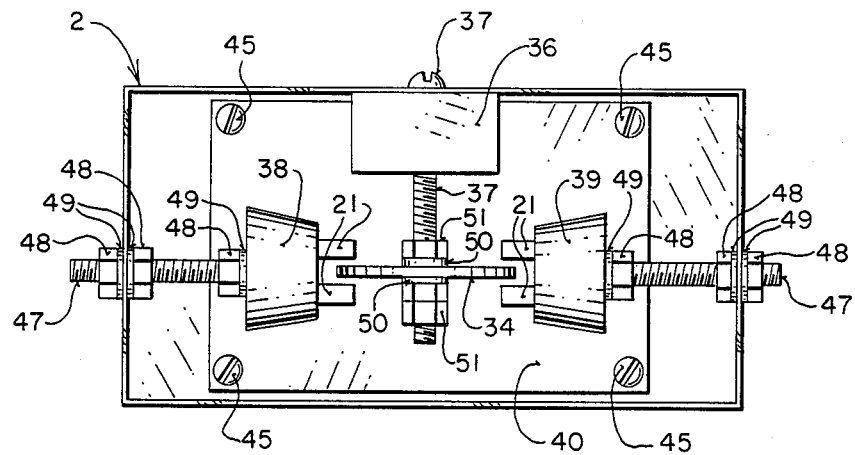
FIG_3
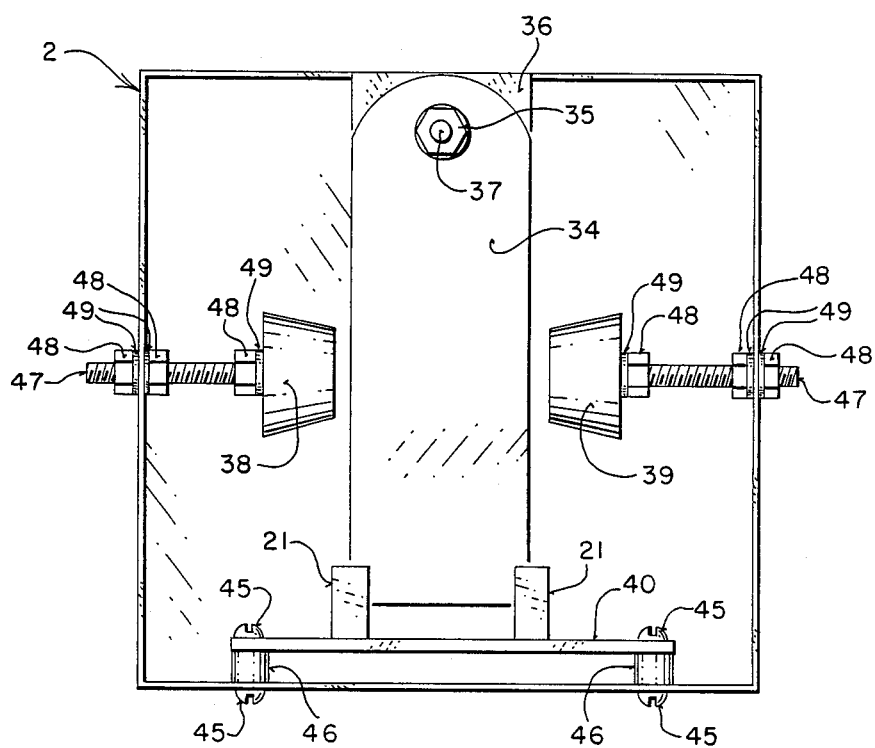
FIG_4

FIG_5
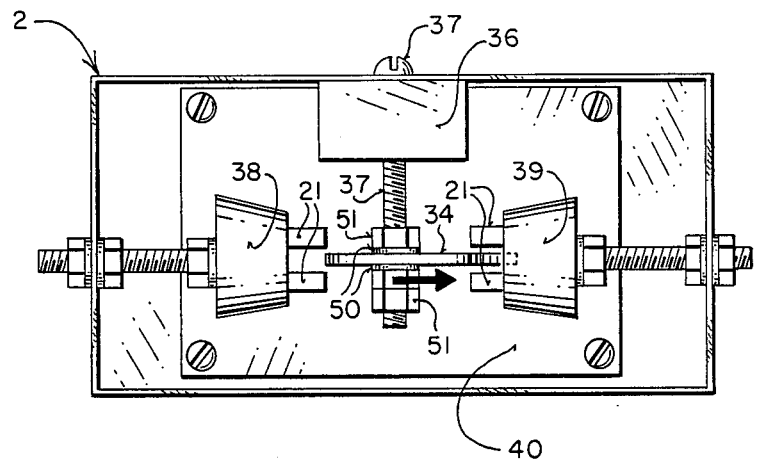
FIG_6
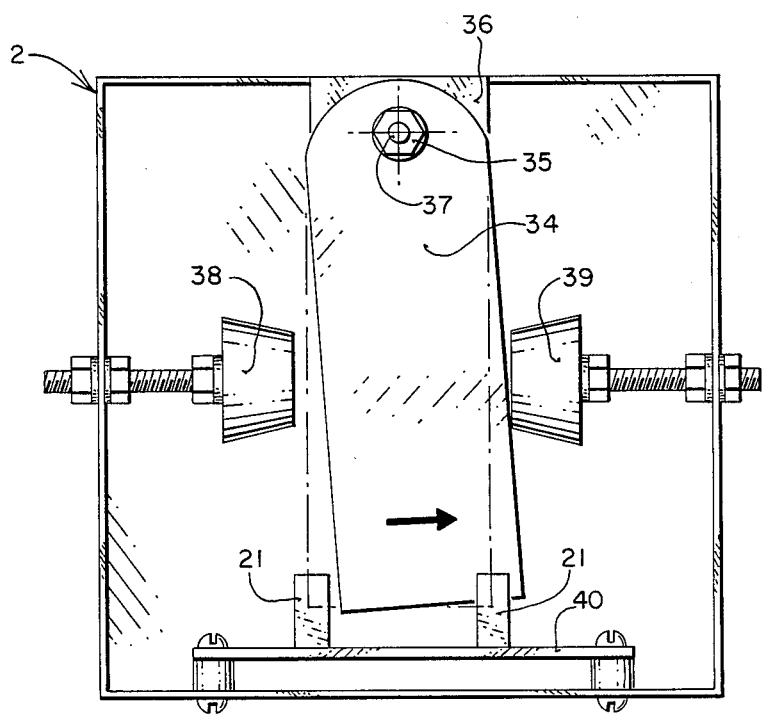

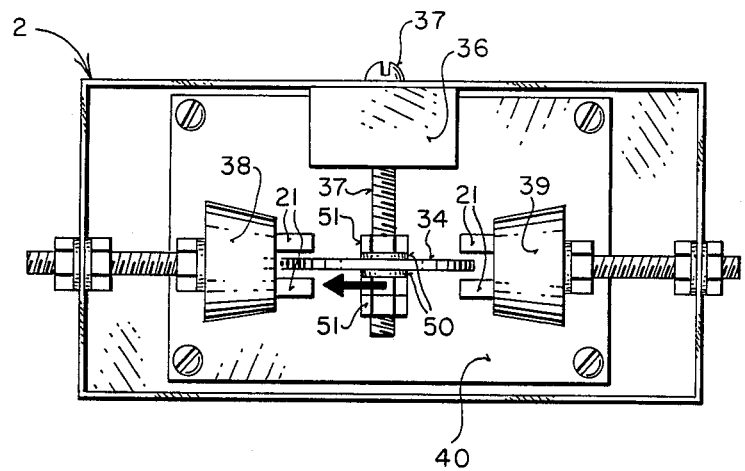
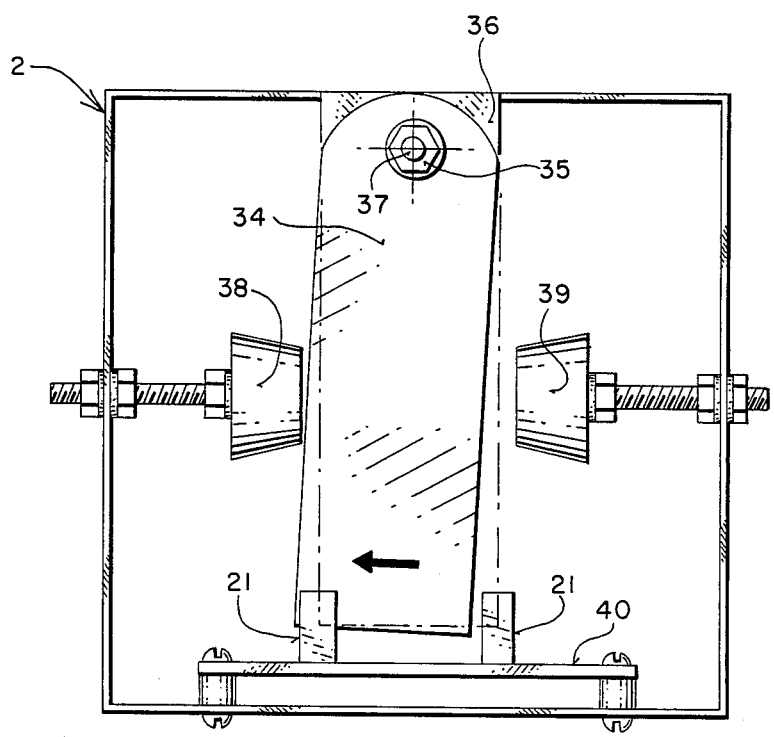

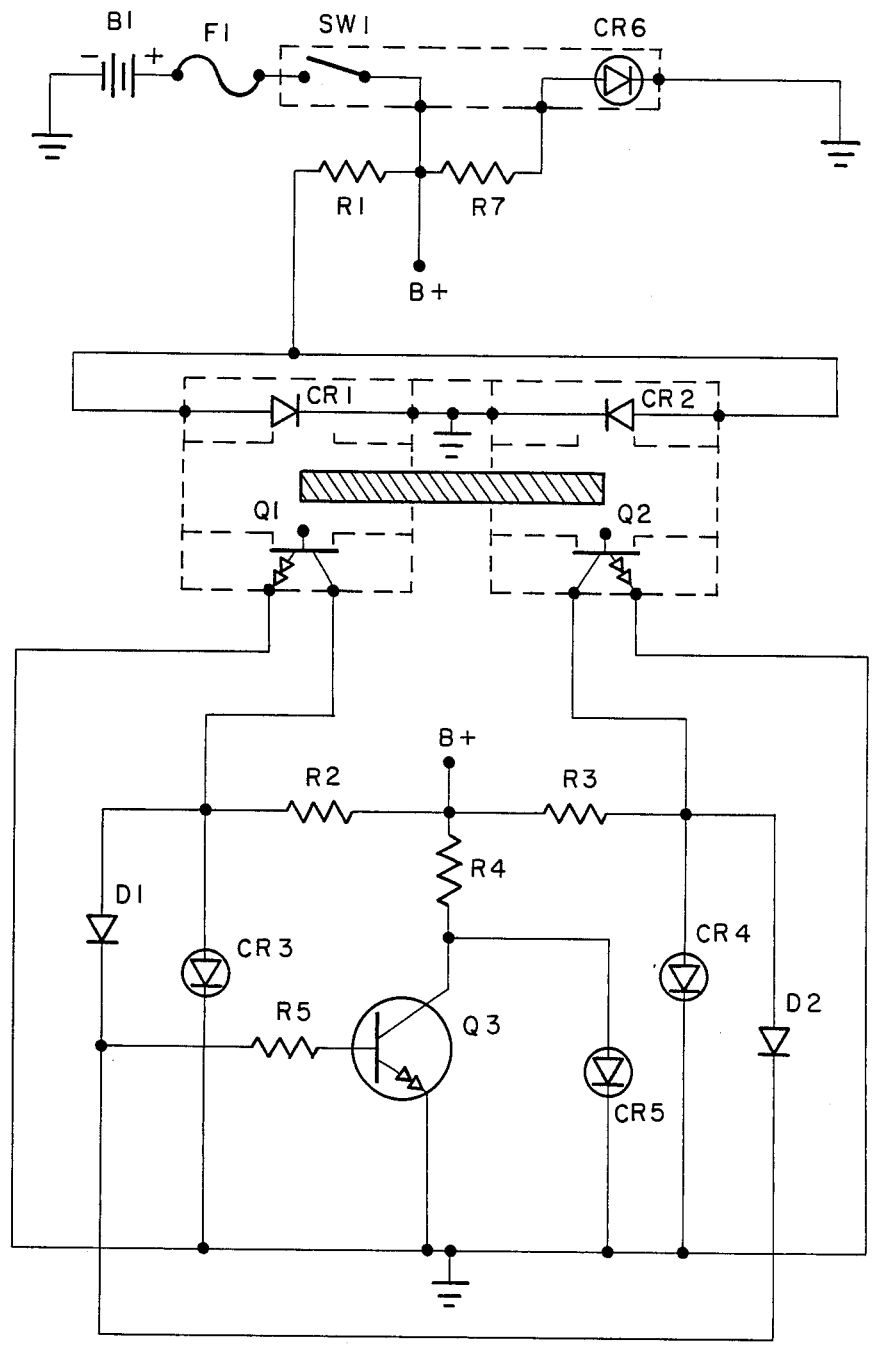
FIG_9

TRAVEL TRAILER LEVEL INDICATOR

BACKGROUND OF THE INVENTION

This invention relates generally to a device used in indicating the horizontal and longitudinal level attitude of a recreation vehicle; remote from said vehicle.

Heretofore the inclination of the horizontal and longitudinal axes of a recreation vehicle was determined by the use of a carpenters type bubble level. The ability to determine said level attitude remote from the recreation vehicle has been recognized and desired for some time. The past method is time consuming and even dangerous. Usually two people must perform the leveling task, the driver of the tow vehicle and another person. Communications between the driver and the second person are usually not good, due to the distance between the back of the recreation vehicle and the driver. Accidents occur causing injury to humans and damage to property.

SUMMARY OF THE INVENTION

This invention relates to a device that is attached to a recreation vehicle used for assisting the operator of the tow vehicle in the leveling process by means of providing an indication of whether or not the recreation vehicle is level, and if not, which side needs to be raised in order to bring the recreation vehicle to a level attitude condition.

The principal object of the invention is to provide instantaneous feedback, to the operator of the tow vehicle, of the current level attitude of the recreation vehicle; feedback which will assist him in the leveling process of the recreation vehicle. Heretofore, the process of leveling a trailer has been time consuming, requiring two people and has been unsafe.

Several objects of the invention are:

(A) Permits driver of tow vehicle to instantaneously determine whether or not the recreation vehicle is level.

(B) Personal safety is enhanced as the driver may single-handedly accomplish the task of leveling the recreation vehicle by simply placing a ramp behind the wheel of the, "low," side of the trailer, and backing the trailer upon the ramp until the driver receives the, "all level," signal from the dash mounted control panel. This operation completes the leveling procedure. This has normally been a two person operation, at times jeopardizing humans and machines.

(C) Invention should replace use of of the old bubble type level and will provide a unit that will accurately indicate which side or end of the recreation vehicle requires elevation to achieve a degree of levelness required to permit safe operation of the propane operated appliances as well as providing personal comfort.

(D) Provide an electronic device that is not affected by the changes in climate and weather.

(E) The display unit, mounted on the instrument panel, will be a practical as as well attractive addition to any tow vehicle.

(F) Further objects and advantages of this invention will become apparent from consideration of the drawings and ensuing description thereof.

| CORDVIC NUMBERING SYSTEM | |
|---|---|
| FIG. 1 | Control/indicator console |
| FIG. 2 | Sensor unit |
| FIG. 3 | Sensor unit: level condition (top view) |

-continued

| CORDVIC NUMBERING SYSTEM | |
|---|---|
| FIG. 4 | Sensor unit: level condition (front view) |
| FIG. 5 | Sensor unit: tilted right (top view) |
| FIG. 6 | Sensor unit: tilted right (front view) |
| FIG. 7 | Sensor unit: tilted left (top view) |
| FIG. 8 | Sensor unit: tilted left (front view) |
| FIG. 9 | Schematic diagram |
| 11 | control/indicator console |
| 12 | control/indicator console face |
| 13 | ON-OFF switch |
| 14 | ON-OFF switch integral LED |
| 15 | fuse holder |
| 16 | fuse, 1 amp fast blow |
| 17 | 12 volt voltage source (from tow vehicle) |
| 18 | R6,510 ohm |
| 19 | R1,250 ohm |
| 20 | CR1 |
| 20' | CR2 |
| 21 | Q1 |
| 21' | Q2 |
| 22 | B+ node |
| 23 | R4,470 ohm |
| 24 | Q3 |
| 25 | CR5, green LED |
| 26 | R3,470 ohm |
| 27 | CR4 |
| 28 | D2 |
| 29 | R2,470 ohm |
| 30 | CR3 |
| 31 | D1 |
| 32 | R5,1.3K |
| 33 | Sensor unit |
| 34 | Compound pendulum |
| 35 | ball bearing |
| 36 | pendulum shaft support |
| 37 | pendulum shaft |
| 38 | left side shock mitigation bumper |
| 39 | right side shock mitigation bumper |
| 40 | PC board |
| 41 | Reference plane |
| 42 | Sensor unit bottom surface |
| 43 | Reference node |
| 45 | Screw |
| 46 | Spacer |
| 47 | Bumper Support Screw |
| 48 | Nut |
| 49 | Washer |
| 50 | Washer |
| 51 | Nut |

BRIEF DESCRIPTION OF THE DRAWINGS

With reference to the accompanying five sheets of drawing:

FIG. 1 is an isometric view of a preferred embodiment of a recreation vehicle level indicator sensor unit incorporating the invention;

FIG. 2 is an isometric view of a preferred embodiment of a recreation vehicle level indicator control/indicator console incorporating the invention;

FIG. 3 is a schematic sectional top view of the recreation vehicle level indicator sensor enclosure of FIG. 1, when it is in a horizontal level condition;

FIG. 4 is a schematic sectional front view of the recreation vehicle level indicator sensor enclosure of FIG. 1, when it is in a horizontal level condition;

FIG. 5 is a schematic sectional top view of the recreation vehicle level indicator sensor enclosure of FIG. 1, when the recreation vehicle upon which the sensor is mounted is subjected to an imbalance to the right;

FIG. 6 is a schematic sectional front view of the recreation vehicle level indicator sensor enclosure of FIG. 1, when the recreation vehicle upon which the sensor is mounted is subjected to an imbalance to the right;

FIG. 7 is a schematic sectional top view of the recreation vehicle level indicator sensor enclosure of FIG. 1, when the recreation vehicle upon which the sensor is mounted is subjected to an imbalance to the left;

FIG. 8 is a schematic sectional front view of the recreation vehicle level indicator sensor enclosure of FIG. 1, when the recreation vehicle upon which the sensor is mounted is subjected to an imbalance to the left;

FIG. 9 is a schematic view of the circuitry which embodies the recreation vehicle level indicator of (FIG. 1 and FIG. 2) to provide electronic indications of the lateral position of the pendulum with respect to the desired level condition.

DETAILED DESCRIPTION OF THE PREFERRED EMBODIMENT

As depicted in FIGS. 1-2, the desired embodiment of a recreation vehicle level indicator is comprised of two main pieces, a control/indicator console and a sensor unit. This configuration allows for the remote mounting of the sensor unit from the control/indicator console.

The first piece, the control/indicator console, is generally referred to by reference number 11. Located on the face 12 is an ON-OFF switch 13 with integral lamp 14, fuse holder 15 and three indicator lamps 25, 27 and 30. The control/indicator console is mounted in the tow vehicle so as to be visible to the operator. For example, a typical mounting location would be on the tow vehicle's dashboard.

The second piece, depicted in FIGS. 2-4, is the sensor unit, generally referred to by reference number 33. It is suitably mounted to a horizontal structural member of the recreation vehicle with fastening screws. A typical mounting location would be the center of the front surface of the forward structural I-beam, located on the recreation vehicle foundation frame.

The main parts in the sensor unit, shown in FIG. 4, are the compound pendulum 34 mounted on shaft 36, shock mitigators 38 and 39 and pendulum position sensors (to be described in more detail later), comprising components 20,20',21 and 21', mounted on circuit board 40. The actual electrical components on the circuit board, as well as their interconnections are not shown for the sake of clarity. The relationship of the pendulum with respect to the pendulum position sensors shall be discussed in more detail later.

Indicator lamps 25, 27 and 30 are used to indicate whether or not the recreation vehicle, upon which the sensor unit is mounted, is in the desired level condition and if not, they are used to indicate which side of the recreation vehicle needs to be raised in order to bring it to a level attitude condition. For example, if lamp 27 is illuminated, this could indicate that the right side of the recreation vehicle needs to be raised. Lamp 25 could be used to indicate that the recreation vehicle is in the desired level attitude condition. Lamps 25, 27 and 30 could be any type of indicator device such as light emitting diodes (LEDs) In addition, they will be different colors to make it easier to distinguish between the different conditions they are indicating.

With reference to FIG. 4, when the longitudinal axis 41 of the compound pendulum 34 is perpendicular to an imaginary line lying in the plane of bottom surface 42 of the sensor enclosure 33, the compound pendulum 34 will be exactly, "centered," and the device will indicate a, "level," condition, hereinafter referred to as a pendulum null condition.

As depicted in FIGS. 4-5, a ball bearing 35 is press fitted in compound pendulum 34. The bearing, in turn, is mounted on rigid shaft 36. The bearing enables the pendulum to swing smoothly between the sets of positional sensors, responding to minute changes in the rotation of the sensor unit about the axis defined by the shaft 37 Each of the positional sensors consists of a light emitting diode 20 and photodarlington transistor 21. Located on either side of the pendulum, the diodes and photodarlington transistors of the separate sets are distinguished from one another by the use of primed numbers. Light emitting diode 20 emits electro-optical radiation in, for example, the infrared range and directs that radiation to associated photodarlington transistor 21. When the longitudinal axis of the pendulum is perpendicular to the bottom surface of the sensor enclosure, as depicted in FIGS. 4-5, the electrooptical radiation emitted by light emitting diodes 20 and 20' is allowed to pass by the sides of compound pendulum and is detected by photodarlington transistors 21 and 21, respectively. When the sensor unit is not level, the pendulum will swing to one side as a response to the gravitational pull of the Earth. The path of electro-optical radiation will be blocked and the consequence is that the electronic circuitry, to be discussed in greater detail later, will detect the cessation of current flow in the affected photodarlington transistor and provide the appropriate indication as to which side needs to be raised in order to bring the recreation vehicle (upon which the sensor is mounted) to a level condition. Hereinafter the set of light emitting diode along with it's associated photodarlington transistor shall be referred to as an emitter detector pair.

As previously mentioned, electronic circuitry is provided to sense the lateral position of the pendulum with respect to the the emitter detector pairs. The accuracy and reliability of such circuitry being well suited for the application of determining whether or not a recreation vehicle is level FIG. 9 is a schematic of such circuitry. The power source 17 for the device is provided by the tow vehicle and is represented as a voltage source connected between ground and one side of 1 amp fast blow fuse 16, which in turn is connected to one side of ON-OFF switch 13. As depicted in FIG. 9, when the ON-OFF switch is in the ON position, the battery will provide a positive voltage through resistor 18 to light emitting diode 14 and to ground, energizing the light emitting diode. In addition, the same positive voltage will be connected to node 22, to power circuitry to be described.

With voltage applied to node 22, infrared LEDs 20 and 20' (CR1 and CR2) are energized. To be more specific, voltage flows via current limiting resistor 19 through infrared LEDs 20 and 20' to ground, energizing them. The resulting electro-optical radiation will pass by the sides of pendulum 34 to their associated photodarlington transistors 21 and 21'.

When the recreation vehicle to which the the sensor unit is mounted is in in a level condition, the compound pendulum 34 is in a pendulum null condition. In this null condition, electrooptical infrared emission produced by light emitting diodes 20 and 20' is allowed to pass along either side of the pendulum. The result is that photodarlington transistors 21 and 21' will enable current to flow through current limiting resistors 29 and 26 and to ground, bypassing light emitting diodes 30 and 27. LEDs 30 and 27 are therefore not energized. Since current is not flowing to node 43 from either diode 31 or 32, darlington transistor 24, acting as an electronic switch is, "OFF." Therefore, all the current flowing through resistor 23 passes through light emitting diode 25, energizing it, indicating a level condition for the recreation vehicle.

As shown in FIGS. 5-6, when the right side of the recreation vehicle upon which the sensor unit is mounted, is lower than desired, the compound pendulum 34 will swing to the right, obliterating the path of the infrared electro-optical emission going from infrared emitting LED 20' to associated photodarlington transistor 21'. The result will be that current will discontinue to flow through photodarlington transistor 21', via current limiting resistor 26. At the same time, a small portion of the current flow through resistor 26 will flow through diode 28 to node 43. The application of voltage to node 43 will cause current to flow, via resistor 32, through darlington transistor 24, switching it, "ON." With darlington transistor 24 switched, "ON," current normally flowing through LED 25, via resistor 23, to ground will now be flowing through darlington transistor 24 to ground via resistor 23. Therefore, LED 25 will no longer remain energized.

Similarly, one can apply the same logic when analyzing the response of the other, "half," of the circuit, when the recreation vehicle is lower on the left side, the imbalance causes the pendulum 34 to swing to the left obliterating the path of infrared electro-optical emission from in between infrared emitting LED 20 and photodarlington transistor 21, causing indicator 30 to energize and indicator LED 25 to de-energize.

It should be noted that the design of the circuit precludes the ambiguous condition of having more than one illuminated light emitting diode. If either light emitting diode 28 or 30 is illuminated, a portion of the current flows to node 43 causing darlington transistor 24 to switch, "ON." When darlington transistor 24 is, "ON," the current normally flowing through light emitting diode 25 now flows through darlington transistor 24 to ground. Therefore, the possibility of simultaneous illumination of multiple light emitting diodes is eliminated.

In this particular embodiment of the circuitry, the following electronic components were selected:

|  | B+ | Voltage 12 volts (from tow vehicle) |
|---|---|---|
| Fuse | F1 | one amp fast blow fuse |
| LEDs | CR3 | (amber) |
|  | CR4 | (orange) |
|  | CR5 | (green) |
| Photon | CR1/Q1 | GE H22B1 |
| Coupled | CR2/Q2 | GE H22B1 |
| Interrupter Modules |  |  |
| Resistors | R1 | Carbon composition 250 ohms +/− 5% |
|  | R2 | Carbon composition 470 ohms +/− 5% |
|  | R3 | Carbon composition 470 ohms +/− 5% |
|  | R4 | Carbon composition 470 ohms +/− 5% |
|  | R5 | Carbon composition 1.3K ohms +/− 5% |
|  | R6 | Carbon composition 510 ohms +/− 5% |
| Diodes | D1 | 1N4007 |
|  | D2 | 1N4007 |
| Darlington Transistor | Q3 | MPS A13 |

What is claimed is:

1. A mechanical/electronic device which detects and optically indicates the horizontal or longitudinal level attitude of a travel trailer comprising:

a sensor unit housing mounted upon the front (first) horizontal frame cross-member, or suitable longitudinal frame position of said travel trailer; unit detects and transmits an electrical signal indicating said horizontal or longitudinal level attitude of said travel trailer to a control/receiver mounted within the driver's compartment of the tow vehicle;

a printed circuit board mounted within said sensor unit housing upon which is mounted two opto-electrical switches and ancillary circuitry to provide an open/closed circuit when actuated;

a free-swinging rectangular compound pendulum, mounted upon a sensitive bearing, supported by a cantilever structure within said sensor unit housing; said opto-electrical switches mounted on said printed circuit board on either side of said rectangular compound pendulum; said rectangular compound pendulum centers between said opto-electrical switches when said rectangular compound pendulum is in a position perpendicular to the horizontal plane; said sensitive bearing, permits said rectangular compound pendulum to swing freely between the emitters and detectors of said opto-electrical switches; when said travel trailer is in an imbalance condition, said rectangular compound pendulum will be moved off-center causing either the right or left opto-electrical switches to be activated; this action generates a specific signal indicating which side, or end, of said travel trailer requires elevating to attain a level attitude; if said travel trailer is level, said rectangular compound pendulum will remain in a centered position and neither said right or left opto-electrical switches will be activated and said sensor unit circuitry will send a signal indicating said travel trailer is positioned in a level attitude;

a signal/power cable carries said signals from said sensor unit circuitry to a connector that will mate with a connector on said tow vehicle, near bumper.

2. A mechanical/electronic device, according to claim 1, mounted within the driver's compartment of said tow vehicle, so positioned to permit the driver of said tow vehicle to have visual access to same;

a plurality of lights, mounted within said control/receiver to visually indicate the level attitude of said travel trailer, when lights are activated by said signal from said sensor unit circuitry;

a signal/power cable extending from said control/receiver back to the rear bumper of said tow vehicle, mating with said connector attached to a cable leading from said sensor unit housing; electrical power for said sensor unit circuitry supplied by vehicle power supply.

3. A mechanical/electronic device, according to claim 1, where said rectangular compound pendulum's normal vertical position, centered between said two opto-electrical switches, changes as the horizontal or longitudinal level attitude of said travel trailer shifts about the longitudinal or horizontal axis; said movement causing said sensor unit housing to simulate said travel trailer attitude changes and the slight rotation displaces said opto-electrical switches from said rectangular compound pendulum's center position and whichever said opto-electrical switch's light beam is unbroken and now permitted to shine past said rectangular compound pendulum, generates an open circuit, which in turn remotely signals said driver, of said tow vehicle, the actual level attitude of said travel trailer; the natural swing of said rectangular compound pendulum is dampened to decrease the time required for said rectangular compound pendulum to come to a resting position.

4. A mechanical/electronic device, as claimed in claim 1, further including:
   a circuit which is designed as a safety feature that will signal the driver of said tow vehicle in the event that a complete electrical disconnect between said travel trailer and said tow vehicle has occurred; in this event, the complete plurality of lights on the control/receiver shall be activated, indicating the complete loss of electrical power to said travel trailer brakes system and to the outside clearance lights.

* * * * *